United States Patent
Lentz

(10) Patent No.: US 11,768,384 B2
(45) Date of Patent: Sep. 26, 2023

(54) POLARIZATION GRATING BASED STAR SIMULATOR

(71) Applicant: US Gov't as represented by Sec'y of Air Force, Wright-Patterson AFB, OH (US)

(72) Inventor: Joshua Lentz, Niceville, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 27 days.

(21) Appl. No.: 17/567,578

(22) Filed: Jan. 3, 2022

(65) Prior Publication Data

US 2022/0214028 A1 Jul. 7, 2022

Related U.S. Application Data

(60) Provisional application No. 63/134,681, filed on Jan. 7, 2021.

(51) Int. Cl.
*G02B 27/42* (2006.01)
*G02B 26/08* (2006.01)
(Continued)

(52) U.S. Cl.
CPC ....... *G02B 27/4261* (2013.01); *G02B 5/1842* (2013.01); *G02B 26/0891* (2013.01); *G03B 21/142* (2013.01)

(58) Field of Classification Search
CPC ..... F21W 2121/008; H04N 9/31–3197; G02B 26/00–129; G03B 21/00–64
See application file for complete search history.

(56) References Cited

U.S. PATENT DOCUMENTS 8,305,523 B2  11/2012  Escuti et al.
8,358,400 B2  1/2013  Escuti et al.
(Continued)

OTHER PUBLICATIONS

Luciano De Sio, David E. Roberts, Zhi Liao, Jeoungyeon Hwang, Nelson Tabiryan, Diane M. Steeves, and Brian R. Kimball, "Beam shaping diffractive wave plates [Invited]," Appl. Opt. 57, A118-A121 (2018).
(Continued)

*Primary Examiner* — Bao-Luan Q Le
*Assistant Examiner* — Christopher A Lamb, II
(74) *Attorney, Agent, or Firm* — AFMCLO/JAZ; Timothy M. Barlow

(57) ABSTRACT

A cycloidal diffractive waveplate based star simulator generates a star field with very high precision star locations and accurate brightness. The present disclosure provides a star simulator that allows for a large FOV, modular, multi-star simulator capable of very high precision dynamic star locations for testing of high accuracy, large FOV star trackers. The system is composed of a light source, a polarization grating-based image [1], and an opto-mechanical system for steering the light. The light is projected onto a diffuse screen where the light is scattered, creating a functional point source at the screen. A star tracker or other device under test views the screen which has a multitude of projected spots (each with its own light source and beam steering device) positioned in a star field distribution appropriate for the simulated viewing direction.

5 Claims, 5 Drawing Sheets

(51) Int. Cl.
  *G03B 21/04* (2006.01)
  *G02B 5/08* (2006.01)
  *G03B 21/14* (2006.01)
  *G02B 5/18* (2006.01)

(56) References Cited

U.S. PATENT DOCUMENTS

| | | | |
|---|---|---|---|
| 8,537,310 B2 | 9/2013 | Escuti et al. | |
| 8,610,853 B2 | 12/2013 | Escuti | |
| 9,195,092 B2 | 11/2015 | Escuti et al. | |
| 2005/0059224 A1* | 3/2005 | Im | H01L 21/02691 438/795 |
| 2012/0188467 A1* | 7/2012 | Escuti | G02F 1/1347 349/1 |
| 2021/0112647 A1* | 4/2021 | Coleman | H05B 45/12 |
| 2021/0364783 A1* | 11/2021 | Naubereit | A61F 9/00825 |

OTHER PUBLICATIONS

Ravi K. Komanduri ; Chulwoo Oh ; Michael J. Escuti, "Reflective liquid crystal polarization gratings with high efficiency and small pitch," Proc. SPIE 7050, Liquid Crystals XII, 70500J (Aug. 28, 2008).

M. Escuti; W. M. Jones, "39.4: Polarization-Independent Switching With High Contrast from a Liquid Crystal Polarization Grating," SID Symposium Digest of Technical Papers, vol. 37, Issue 1, pp. 1443-1446, Jun. 2006.

F. Gori, "Measuring Stokes parameters by means of a polarization grating," Opt. Lett. 24, 584-586 (1999).

J. Tervo and J. Turunen, "Paraxial-domain diffractive elements with 100% efficiency based on polarization gratings," Opt. Lett. 25, 785-786 (2000).

S. Serak, D. Roberts, J. Hwang, S. Nersisyan, N. Tabiryan, T. Bunning, D. Steeves, and B. Kimball, "Diffractive waveplate arrays [Invited]," J. Opt. Soc. Am. B 34, B56-B63 (2017).

J. Kim, R. Komanduri, K. Lawler, D. Kekas, and M. Escuti, "Efficient and monolithic polarization conversion system based on a polarization grating," Appl. Opt. 51, 4852-4857 (2012).

M. Hamaoui, "Polarized skylight navigation," Appl. Opt. 56, B37-B46 (2017).

S. Nersisyan, N. Tabiryan, L. Hoke, D. Steeves, and B. Kimball, "Polarization insensitive imaging through polarization gratings," Opt. Express 17, 1817-1830 (2009).

Nersisyan, S. R.; Tabiryan, N. V.; Steeves, D. M.; Kimball, B. R., "The principles of laser beam control with polarization gratings introduced as diffractive waveplates" Proceedings of the SPIE, vol. 7775, id. 77750U (2010).

Nersisyan, S. R.; Tabiryan, N. V.; Steeves, D. M.; Kimball, B. R., "Optical Axis Gratings in Liquid Crystals and Their Use for Polarization Insensitive Optical Switching", Journal of Nonlinear Optical Physics and Materials, vol. 18, Issue 01, pp. 1-47 (2009).

\* cited by examiner

POLARIZATION GRATING BASED STAR SIMULATOR

CROSS-REFERENCE TO RELATED APPLICATIONS

This application claims the benefit of priority under 35 U.S.C. § 119(e) to U.S. Provisional Application Ser. No. 63/134,681 entitled "Cycloidal diffractive waveplate based star simulator", filed 7 Jan. 2021, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to star simulation projection, and more particular to optical steering of star simulators.

2. Description of the Related Art

There is currently no star simulation capability available for large field of view (FOV) star trackers (~7 degrees or larger) with very high precision tracking (~1 μrad). Capabilities exist for: (1) single spot calibration, for high angular resolution with full field limited to approximately 1 degree; (2) low angular resolution over a large FOV. Typical approaches for the desired full field, multi-star simulation is to use a spatial light modulator (e.g. Liquid Crystal on Silicon or Digital Micromirror Device) at or very near the front of the star tracker device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The present disclosure provides a hardware system for generating a star field with very high precision star locations and accurate brightness. The present disclosure provides a star simulator that allows for a large FOV, modular, multi-star simulator capable of very high precision dynamic star locations for testing of high accuracy, large FOV star trackers. The system is composed of a light source, a polarization grating-based image [1], and an opto-mechanical system for steering the light. One example of a polarization grating is a cycloidal diffractive waveplate (CDW). The light is projected onto a diffuse screen where the light is scattered, creating a functional point source at the screen. A star tracker or other device under test views the screen which has a multitude of projected spots (each with its own light source and beam steering device) positioned in a star field distribution appropriate for the simulated viewing direction.

Figure 1:
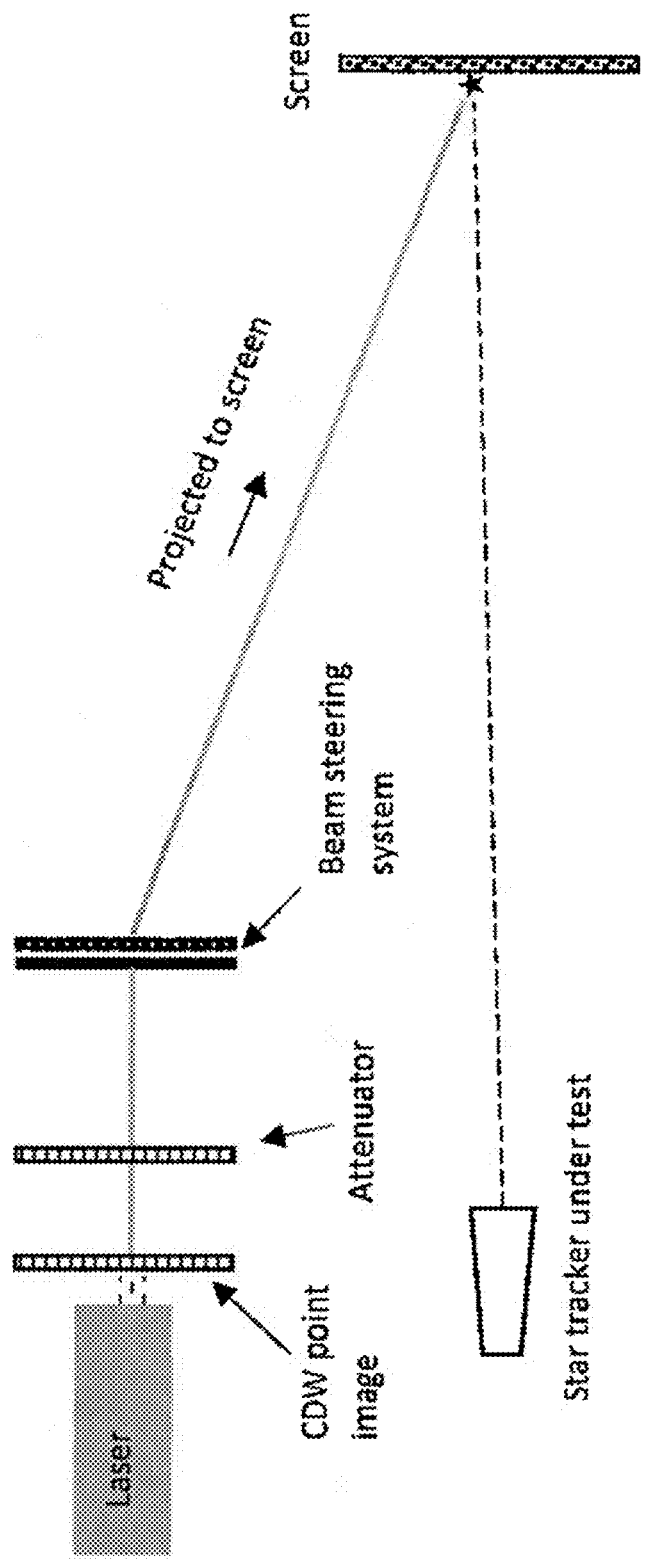
FIG. 1 illustrates a functional block diagram of a projection system basic elements for a single star, according to one or more embodiments.

FIG. 1 illustrates a functional block diagram of a projection system basic elements for a single star. The basic beam steering system is an opto-mechanical combination of two polarization gratings (e.g., CDW), each mounted in a high precision rotation stage such that the system functions in a manner analogous to Risley Prism pairs. A tradeoff exists between the FOV, angular accuracy of star positions and system complexity/cost. Additional FOV extension can be added by inclusion of additional polarization gratings in rotation stages.

The light source is a laser with a wavelength that matches the design wavelength of the polarization gratings in the system. The laser illuminates a polarization grating based image which is a small point object (~4 μm diameter) and will produce that image on the far field (at the screen} with only the spot spread resulting from the laser. Unlike the traditional point aperture or intensity mask approaches, the polarization grating-based image produces no diffraction spread of the spot and no diffraction patterns (i.e. rings, etc.) since it is formed using phase information and interference phenomena.

The brightness of a simulated star can be set with a fixed attenuator or can be dynamic using an attenuator such as a variable neutral density filter. The attenuator is considered to be an optional component since the laser intensity may also be used to set the brightness of the simulated star. Through this simulation approach, each star may be moved independently of each other within the limit of the beam steering accuracy.

Figure 2:
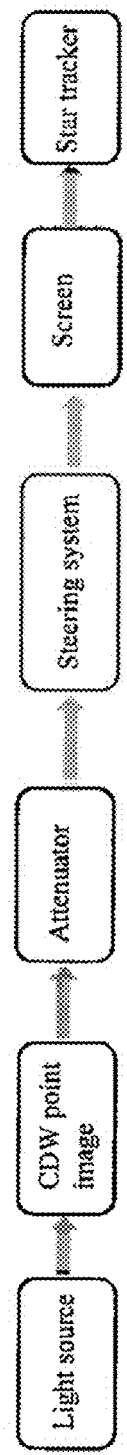
FIG. 2 illustrates a generalized flow diagram representing light movement through the system, according to one or more embodiments.

FIG. 2 illustrates a generalized flow diagram representing light movement through the system. Many variations of this simulation system are possible and are described herein. The complete simulator requires star generators (as many as desired), a diffuse screen and an optional collimator depending on the star tracker details and the available space. Each star generator consists of a light source (i.e. laser) in the spectrum of interest, an attenuator and a beam steering system. The star generator system is illustrated with the flow diagram in FIG. 2. Details of each component are given below. Details of the polarization grating-based point image may dictate additional elements such as a beam expander and/or homogenizer.

The present innovation possesses inherent modularity in the way additional stars can be added to the system. If a light source is selected that has sufficient energy output for generating multiple stars, beam splitters can be introduced to effectively create additional star light sources with reduced cost for additional star elements.

Actual designs cannot be included here without knowledge of the star trackers to be tested, including their effective focal length, spectral sensitivity and entrance pupil diameter. These parameters determine if a collimator is needed and how much energy is needed on the screen for each star and what type of light source is needed.

For a laser source, the laser beam must be larger than the polarization grating pattern needed to generate the point image element, details which are dependent on the polarization grating pattern which is based on system requirements.

The screen is coated with a diffuse, reflective coating so that the incident light is reflected into a diffuse cone that is collected by the star tracker. In this case, the light scattered by the screen appears to be the source of light rather than the actual light source (laser or other). If the screen-to-star tracker distance exceeds the hyper focal distance of the star tracker, no collimator is needed. If it is not exceeded, optics are needed to flatten the wavefront and make it appear to originate from infinity.

For the case of a large FOV simulator, the star tracker under test and/or the collimator (if needed) may obscure a region of the screen from the steering system. In this case, one or two additional star generators or subcomponents may be required at other locations around the collimator or star tracker under test in order to enable the star to be projected anywhere on the screen.

Figure 3A:
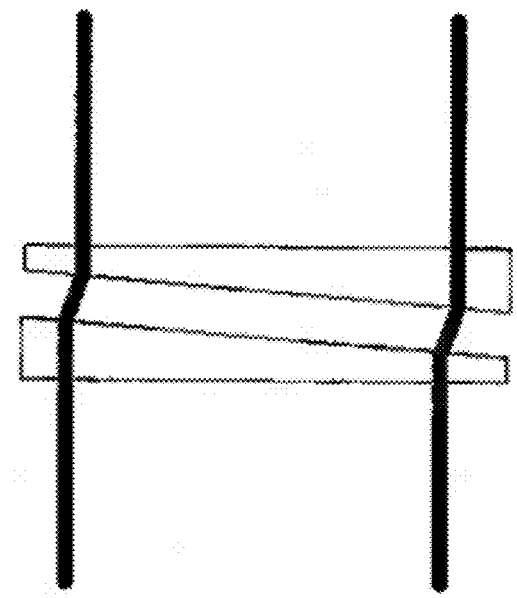
FIG. 3A illustrates a pair of Risley prisms in first rotational positions to steering with no angle, according to one or more embodiments.
Figure 3B:
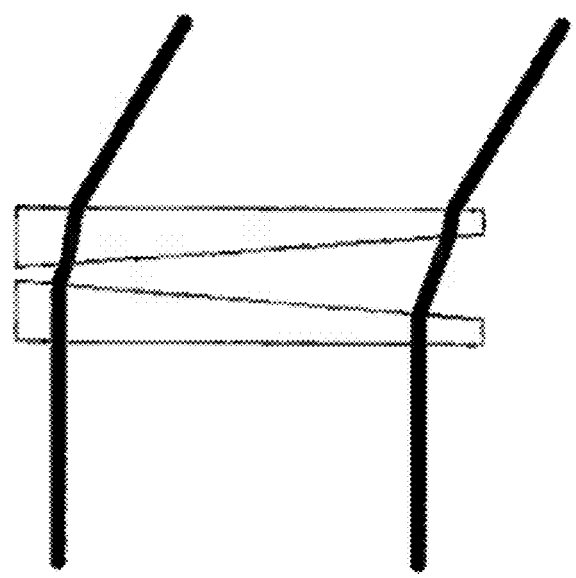
FIG. 3B illustrates the pair of Risley prisms of FIG. 3A in second rotational steering positions to steering with an induced angle, according to one or more embodiments.

FIG. 3A illustrates a pair of Risley prisms in first rotational positions to steering with no angle. FIG. 3B illustrates the pair of Risley prisms of FIG. 3A in second rotational steering positions to steering with an induced angle. Risley prisms are basic wedge prisms that have been used for decades to provide optical pointing and steering functions. Typically, they exist in pairs and are rotated independently of each other, allowing energy to be steered over a hemisphere of space, with the limitation in angular precision being established by the precision of rotation of the prisms. The steering function is a result of the refraction-induced angular change of light passing through the prism. The magnitude of angular change is fixed for a given prism but the direction of the output light can be adjusted by rotating the prism.

Figure 4:
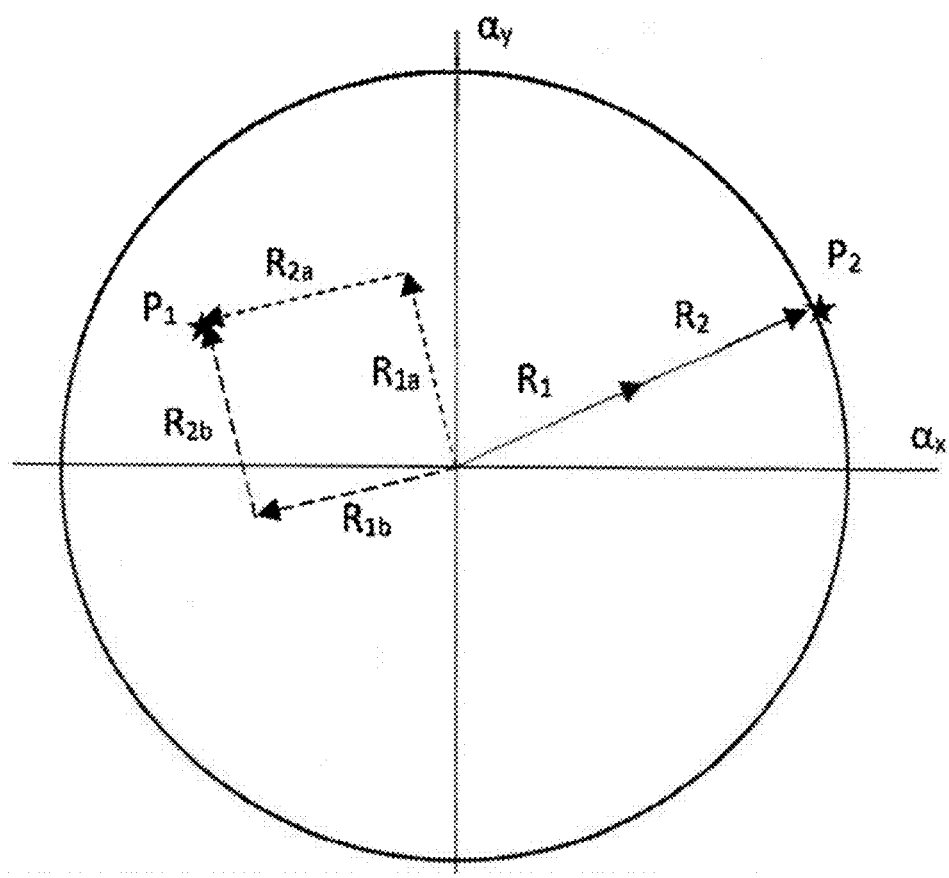
FIG. 4 illustrates a diagram of pointing solutions in angular space for a Risley prism pair, according to one or more embodiments.

FIG. 4 illustrates a diagram of pointing solutions in angular space for a Risley Prism pair. With paired Risley prisms, the entire angular range from on-axis to twice the angular shift of a single prism can be accomplished. The function of Risley Prisms is demonstrated in FIG. 4. For the case of a point on the outer circle defining the range of pointing of the Risley Prisms, a point P2 in angular space can be reached with exactly one solution, the case of both prisms being rotated to the same axial position such that the angular change of light is doubled. In the case of a generic point P1 within the pointing range and not at the axial (0 angle) position of the pointing, two complementary solutions exist. The two solutions correspond to reversing the order of prism rotation (i.e. in solution 1, prism 1 is rotated by x and prism 2 is rotated by y, and for solution 2, prism 1 is rotated by y and prism 2 is rotated by x). The vectorial sum of the prism pointing in angle space is the same for both.

The last case of the Risley Prisms is for axial steering. Whereas a point on the outer circle has exactly one solution, a point in the interior, non-zero region has two solutions, the zero point has infinite solutions. In this case the choice of rotation on one prism is arbitrary and the second prism is required to be rotated in exactly the opposite direction such that the vector sum of the two is zero.

The function of Risley Prisms can be accomplished via any mechanism that results in a fixed angular offset of light. In the case of Risley Gratings [2, 16], diffraction is used to generate the angular offset by sending all of the light into a particular nonzero diffracted order, typically in a polymerized grating form. This technique allows a very lightweight solution to Risley functions, reducing the demand on rotation stages and associated motor control as well as eliminating the chromatic aberration associated with the prism. The disadvantage of the Risley Grating is that 50% of the original source light is likely to be lost through a polarization process needed to reduce the grating to a single order output. In some cases, a circularly polarized source can be used in which case the loss would not occur.

An additional method for the angular deviation of light is a particularly designed photonic crystal structure is contained in U.S. patent application Ser. No. 16/922,079, entitled "Photonic Crystal Risley Prisms" filed 7 Jul. 2020, the disclosure of which is hereby incorporated by reference in its entirety. In order for the photonic crystals to have the beam diverting properties necessary, they must be spatially variant photonic crystals. These have recently been reported to be self-collimating while re-directing energy at an angle of 90 degrees. Other, lower angular deviations are also possible using the same techniques. Designs could theoretically be extended to achromatic function. One embodied variant of the present disclosure is to use more than two Risley beam steering elements to increase the FOV. A substitution can be made for the beam steering system, using traditional Risley prisms or photonic crystal beam steering system that functions as a Risley analogue with any of the beam steering methods referenced therein.

Dynamic star attenuation can be accomplished using modulation of the light source. LEDs (with spectral filters if needed) may be used in place of a laser as a light source. The screen may be polarization preserving. The screen may include spectral filtering to reduce stray light. A back projection system could be utilized in which the diffuse screen is transmissive rather than reflective and the beam steering system for each star is located on the side of the screen opposite the star tracker under test. The diffuse screen may be made of a solid, a flexible fabric or a liquid filled container, the liquid containing diffusing materials within. The diffusing screen may be planar, curved in one dimension, or curved in two dimensions. The light source may be narrow band, broad band or multispectral. The screen may be coated with a material that emits with different spectral qualities than inherent to the light source. The polarization grating star pattern generator may include a multiplicity of stars with fixed relative positions with this star field region being steered around the screen as a unit. Multiple light sources of different wavelengths can be combined for broader spectrum or multispectral systems. The distance from beam steering system to screen may be greater than, equal to or less than the distance from the screen to the unit under test.

Figure 5:
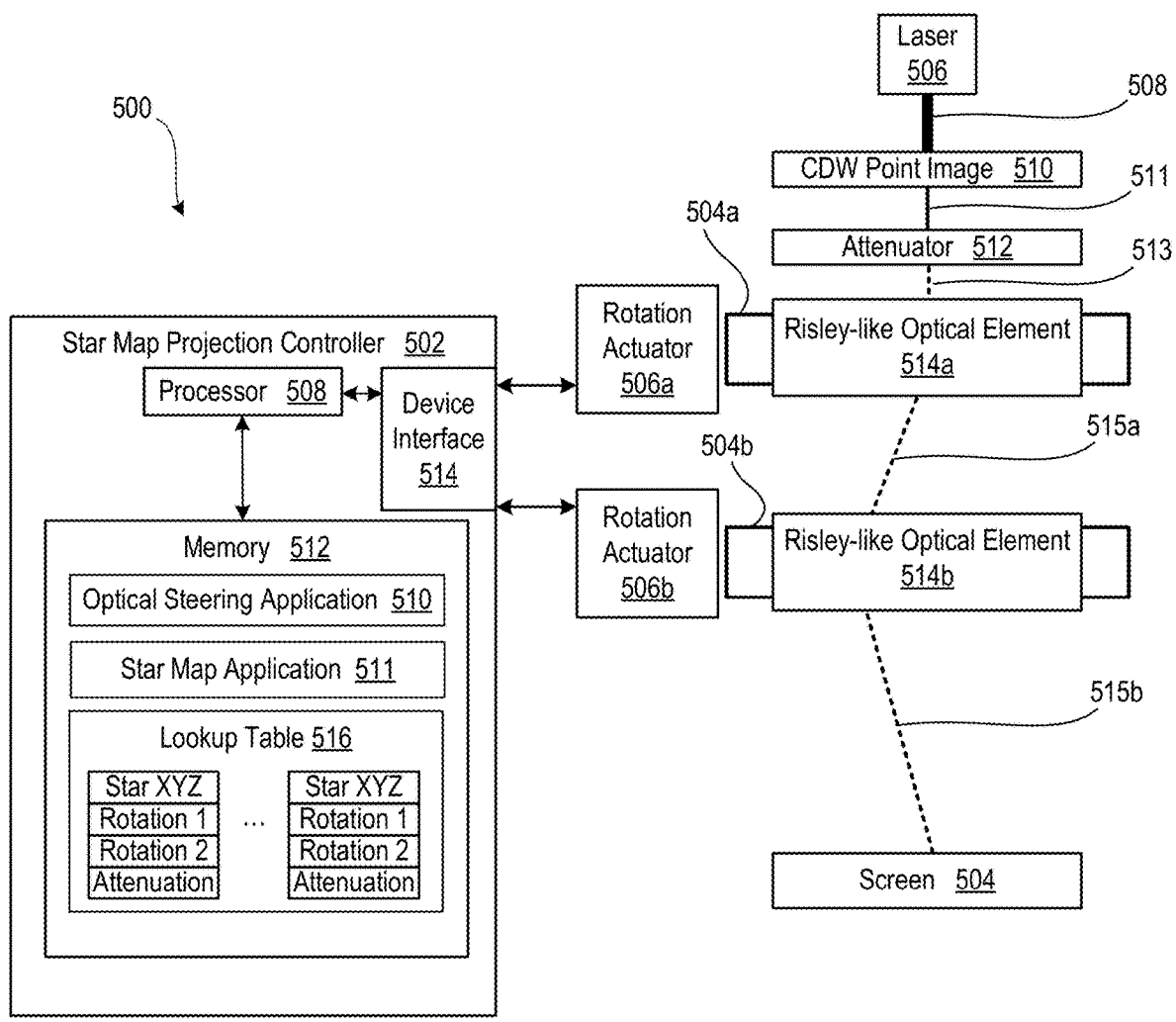
FIG. 5 illustrates a control diagram of pointing solutions in angular space for a Risley prism pair, according to one or more embodiments.

FIG. 5 illustrates a control diagram of star field projection system 500 in angular space for a Risley prism pair. A star map projection (SMP) controller 502 controls positioning and attenuation of a star simulation presented on a screen 504. A laser 506 projects a laser beam 508 that is reduced in size by a polarization grating point image 510. A reduced size laser beam 511 passes through a dynamic attenuator 512 that is adjusted by the SMP controller 502. An attenuated laser beam 513 passes through a first Risley-like optical element ("Risley element") 514a that deflects a first angled laser beam 515a as a function of the rotational position of the first Risley element 514a. The first angled laser beam 515a passes through a second Risley element 514b that deflects a second angled laser beam 515b onto the screen 504 as a function of the rotational position of the second Risley element 514b. Risley elements 514a-514b are respectively held in holders 516a-516b. The SMP controller 502 drives rotation actuators 517a-517b to respectively and independently rotate the holders 516a-516b. In particular, the SMP controller 502 includes a processor 518 that accesses an optical steering application 520 stored in device memory 522 to execute the rotations via a device interface 524 according to a lookup table 526. The processor executes a star map application 528 that dynamically updates positions of a star field contained in the lookup table 526. The lookup table 526 defines one or more star simulations by two rotational positions required for Risley elements 514a-514b as well as an amount of attenuation.

Figure 6:
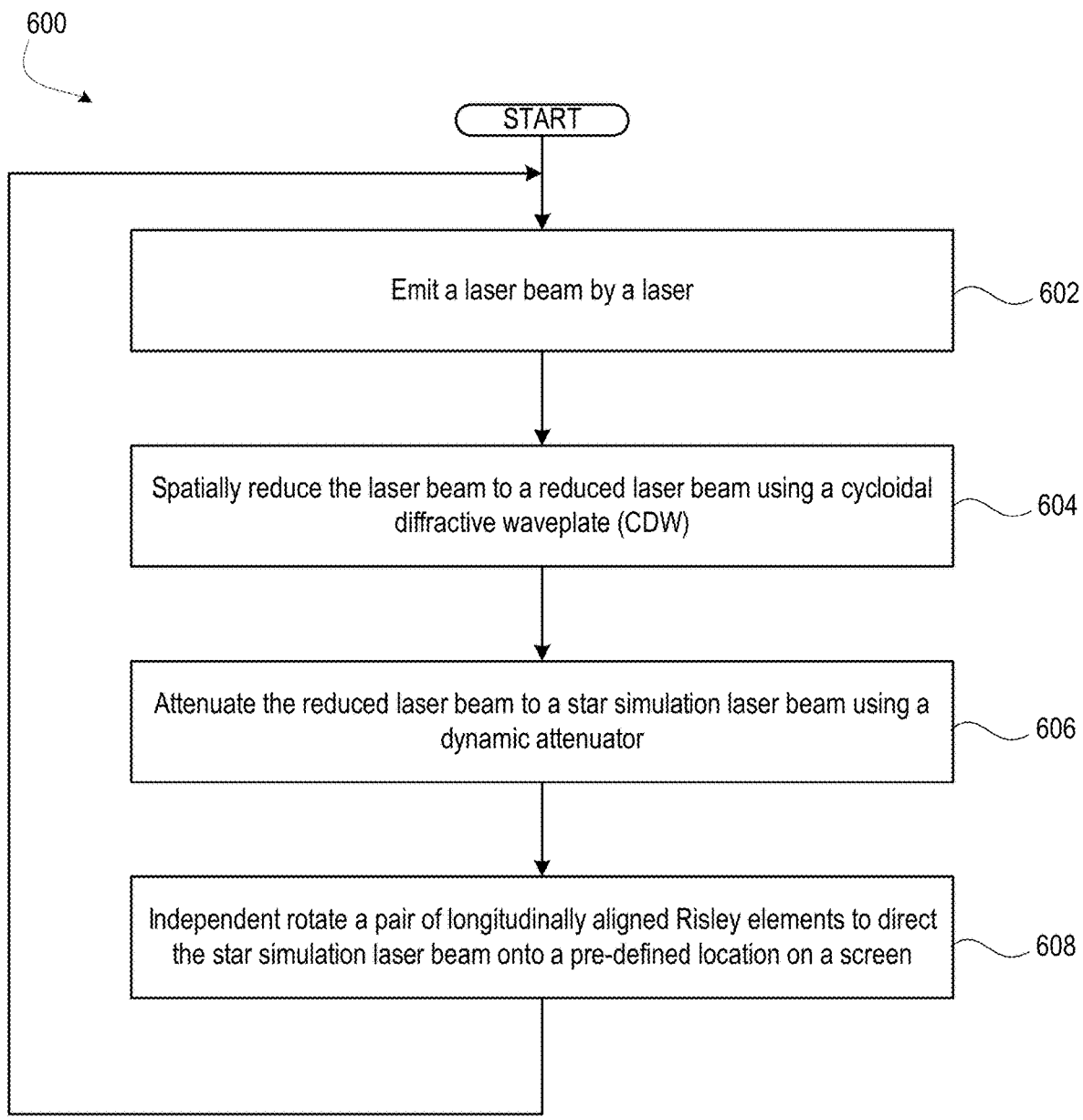
FIG. 6 presents a flow diagram of a method for controlling a very high precision dynamic star location projector, according to one or more embodiments.

FIG. 6 presents a flow diagram of a method 600 for controlling a very high precision dynamic star location projector using polarization gratings and shift-invariant optical elements ("Risley elements"). The method 600 includes emitting a laser beam by a laser (block 602). Method 600 includes spatially reducing the laser beam to a reduced laser beam using a polarization grating (e.g., CDW) (block 604). Method 600 includes attenuating the reduced laser beam to a star simulation laser beam using a dynamic attenuator (block 606). Method 600 includes independently rotating a pair of longitudinally aligned Risley elements to direct the star simulation laser beam onto a pre-defined location on a screen (block 608). Then method 600 returns to block 602.

The following references cited above are hereby incorporated by reference in their entirety:

(1) Luciano De Sio, David E. Roberts, Zhi Liao, Jeoungyeon Hwang, Nelson Tabiryan, Diane M. Steeves, and Brian R. Kimball, "Beam shaping diffractive wave plates [Invited]," Appl. Opt. 57, A118-A121 (2018).
(2) Ravi K. Komanduri; Chulwoo Oh; Michael J. Escuti, "Reflective liquid crystal polarization gratings with high efficiency and small pitch," Proc. SPIE 7050, Liquid Crystals XII, 70500J (Aug. 28, 2008).
(3) M. Escuti; W. M. Jones, "39.4: Polarization-Independent Switching with High Contrast from a Liquid Crystal Polarization Grating," SID Symposium Digest of Technical Papers, Volume 37, Issue 1, pages 1443-1446, June 2006.
(4) F. Gori, "Measuring Stokes parameters by means of a polarization grating," Opt. Lett, 24, 584-586 (1999).
(5) J. Tervo and J. Turunen, "Paraxial-domain diffractive elements with 100% efficiency based on polarization gratings," Opt. Lett. 25, 785-786 (2000),
(6) Ravi K. Komanduri; Chulwoo Oh; Michael J. Escuti; "Reflective liquid crystal polarization gratings with high efficiency and small pitch." Proc. SPIE 7050, Liquid Crystals XII, 70500J (Aug. 28, 2008);
(7) S. Serak, D. Roberts, J. Hwang, S. Nersisyan, N. Tabiryan, T. Bunning, D. Steeves, and B. Kimball, "Diffractive waveplate arrays [Invited]." J. Opt. Soc. Am. B 34, 856-863 (2017);
(8) J. Kim, R. Komanduri, K. Lawler, D. Kekas, and M. Escuti, "Efficient and monolithic polarization conversion system based on a polarization grating," Appl. Opt. 51, 4852-4857 (2012).
(9) M. Hamaoui, "Polarized skylight navigation," Appl. Opt. 56, B37-646 (2017).
(10) S. Nersisyan, N. Tabiryan, L. Hoke, D. Steeves, and B. Kimball, "Polarization insensitive imaging through polarization gratings." Opt. Express 17, 1817-1830 (2009).
(11) Nersisyan, S. R.; Tabiryan, N. V.; Steeves, D. M.; Kimball, B. R., "The principles of laser beam control with polarization gratings introduced as diffractive waveplates" Proceedings of the SPIE, Volume 7775, id. 77750U (2010).
(12) Nersisyan, S. R.; Tabiryan, N. V.; Steeves, D. M.; Kimball, B. R, "Optical Axis Gratings in Liquid Crystals and Their Use for Polarization Insensitive Optical Switching", Journal of Nonlinear Optical Physics and Materials, Volume 18, Issue 01, pp. 1-47 (2009).
(13) U.S. Pat. 9,195,092, Escuti, et al., "Polarization-independent liquid crystal display devices including multiple polarizing grating arrangements and related devices", Aug. 15, 2013.
(14) U.S. Pat. No. 8,610,853, Escuti, "Methods of fabricating optical elements on substrates and related devices," Dec. 19, 2012
(15) U.S. Pat. No. 8,537,310, Escuti, et al., "Polarization-independent liquid crystal display devices including multiple polarization grating arrangements and related devices," Apr. 15, 2010.
(16) U.S. Pat. No. 8,358,400, Escuti, "Methods of fabricating liquid crystal polarization gratings on substrates and related devices" Jan. 22, 2013
(17) U.S. Pat. No. 8,305,523, Escuti, et al., "Multi-layer achromatic liquid crystal polarization gratings and related fabrication methods," Nov. 6, 2012

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been, presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A star map projection system consisting of:
    a laser that emits a laser beam;
    a polarization grating that spatially reduces the laser beam to a reduced laser beam;
    an attenuator that attenuates the reduced laser beam to form an attenuated laser beam;
    a first Risley element in a first holder that deflects the reduced laser beam to form a first angled laser beam, the first holder providing independent rotation of the first Risley element;
    a second Risley element in a second holder that receives the first angled laser beam and forms a second angled laser beam which is directed onto a screen, the second holder providing independent rotation of the second Risley element;
    a controller that independently rotates each Risley element to position the simulated star laser beam onto a pre-defined location on the screen;
    a pair of rotation actuators in communication with the controller through a device interface that are respectively engaged to the first and second holders for rotation of the Risley elements, the controller comprising
        a memory containing an application and a lookup table, wherein the controller comprises a processor that executes the application to:
        monitor current rotation positions respectively of the first and second Risley elements reported by the first and second rotation actuators;
        determine a pre-defined location on the screen;
        determine a change in rotation positions of the first and second Risley elements specified in the lookup table based on current rotation positions and a two-dimensional position of the second angled laser beam; and
        actuate the first and second rotation actuators to effect a change in the rotation positions of the first and second Risley elements.

2. The star map projection system of claim 1, wherein the attenuator consists of a dynamic attenuator that is communicatively coupled to the controller to adjust an amount of attenuation by the dynamic attenuator.

3. The star map projection system of claim 1, wherein the pair of Risley optical elements each comprise a Risley prism.

4. The star map projection system of claim 1, wherein the pair of Risley optical elements each comprise a Risley grating.

5. The star map projection system of claim 1, wherein the pair of Risley optical elements each comprise a photonic crystal.

* * * * *